United States Patent
Kaplan

(10) Patent No.: US 8,140,346 B2
(45) Date of Patent: Mar. 20, 2012

(54) COMPUTER-IMPLEMENTED METHOD AND SYSTEM FOR HANDLING BUSINESS TRANSACTIONS WITHIN AN INHOMOGENEOUS LEGAL ENVIRONMENT

(75) Inventor: Ibrahim Kaplan, Wiesbaden (DE)

(73) Assignee: International Business Machines Corporation, Armonk, NY (US)

( * ) Notice: Subject to any disclaimer, the term of this patent is extended or adjusted under 35 U.S.C. 154(b) by 2505 days.

(21) Appl. No.: 10/206,559

(22) Filed: Jul. 26, 2002

(65) Prior Publication Data

US 2003/0041033 A1 Feb. 27, 2003

(30) Foreign Application Priority Data

Aug. 16, 2001 (EP) .................................... 01119832

(51) Int. Cl.
*G06Q 10/00* (2006.01)
(52) U.S. Cl. ......................................... 705/1.1; 705/331

(58) Field of Classification Search ............... 705/1, 331
See application file for complete search history.

(56) References Cited

U.S. PATENT DOCUMENTS

| 6,460,020 B1 | 10/2002 | Pool et al. ....................... 705/26 |
| 2002/0023109 A1* | 2/2002 | Lederer, Jr. et al. .......... 707/511 |
| 2002/0120477 A1* | 8/2002 | Jinnett ............................. 705/4 |
| 2002/0184068 A1* | 12/2002 | Krishnan et al. .................. 705/8 |

* cited by examiner

*Primary Examiner* — Dennis Ruhl
(74) *Attorney, Agent, or Firm* — Hoffman Warnick LLC

(57) ABSTRACT

A mechanism for performing business transactions, comprising an integrator service connected to a first company's intranet or an independent legal integrator service provider. Prior to execution of a transaction, a communication channel between the first company and the integrator service is established to exchange relevant information such as the source and target country of the transaction and the kind of goods to be transferred. Based on the exchanged information, the integrator service determines any relevant legal issue, in the present case a relevant import/export regulation issue and delivers a compliance statement to the first company.

5 Claims, 5 Drawing Sheets

(Single Process / B2C)

(Global Processing / B2B)

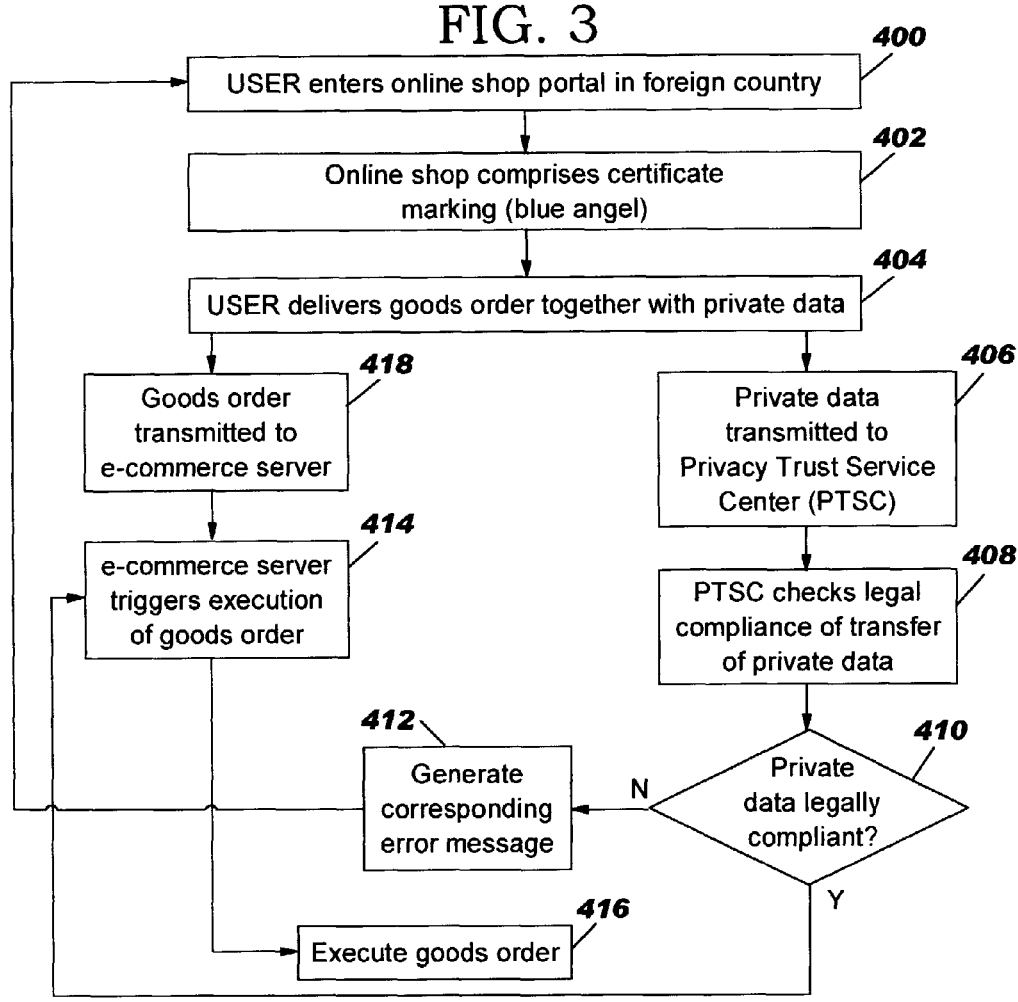

FIG. 4

| ID | Table : 1.1 | Privacy Policy Level - | Level 0-2 | | | | Project : EIM=Enterprise Inf. Mngmn.. | | | | |
|---|---|---|---|---|---|---|---|---|---|---|---|
| Name: | Enterprise Information Management with EU-Privacy | | | | | | | | | | |
| | Conditions | | | Business Unit | | | Condition Panels/Monitor | | | | Ranking |
| | | | | 1. | 2. | 3. | 4. | Data Traffic | | | |
| | | | | EIRM|EISM | EIPM | EICM | Ent | bw.Ezw.Ebw.Ebw.E Pers Gov Glob | | | 1 Min. 10 Max |
| | Objectives of e-Privacy System | | | | | | | | | | |
| C1 | good level of compliance | | | | | | | | | | |
| C2 | support and help to individual data subjects | | | | | | | | | | |
| C3 | appropriate redress | | | | | | | | | | |
| | Basic Principals of EU-Data Protection | | | | | | | | | | |
| C4 | the purpose limitation principle | | | | | | | | | | |
| C5 | the data quality and proportionality principle | | | | | | | | | | |
| C6 | the transparency principle | | | | | | | | | | |
| C7 | the security principle | | | | | | | | | | |
| C8 | the rights of access, rectification and opposition | | | | | | | | | | |
| B9 | restrictions on onward transfers | | | | | | | | | | |
| | Additional Principals | | | | | | | | | | |
| C10 | The economically and Business management control | | | | | | | | | | |
| C11 | Consider of international Privacy Regulations | | | | | | | | | | |
| | Actions | | | | | | | | | | |
| A1 | deliver a good level of compliance with the rules | | | | | | | | | | |
| A2 | provide support and help to individual data subjects | | | | | | | | | | |
| A3 | provide appropriate redress to the injured party | | | | | | | | | | |
| A4 | process data only for a specific purpose and subsequently used | | | | | | | | | | |
| A5 | data should be accurate and, where necessary, kept up to date | | | | | | | | | | |
| A6 | provided with information as to the purpose of the processing | | | | | | | | | | |
| A7 | take technical and organizational security measures control | | | | | | | | | | |
| A8 | process data subject should have a right to obtain a copy of all data | | | | | | | | | | |
| A9 | permit of the personal data by the recipient of the original data | | | | | | | | | | |
| A10 | process data only in relation with cost efficience | | | | | | | | | | |
| A11 | consider by data process international regulation | | | | | | | | | | |

FIG. 4 (cont'd)

| | List of the Reference Systems | | | | | | | | Summe |
|---|---|---|---|---|---|---|---|---|---|
| L1 | | | | | | | | | |
| L2 | | | | | | | | | |
| L3 | | | | | | | | | |
| L4 | | | | | | | | | |
| L5 | | | | | | | | | |
| L6 | | | | | | | | | |
| L7 | | | | | | | | | |
| L8 | | | | | | | | | |
| L9 | | | | | | | | | |
| L10 | | | | | | | | | |
| L11 | | | | | | | | | |

LEGENDE
EIM=Enterprise Information Management            E=Enterprise
EIRM=Enterprise Information Resource Management   Per=Person
EISM=Enterprise Information System Management     Gov=Government
EIPM=Enterprise Information Proze6 Management     Global=Global
EICM=Enterprise Information Controlling Management

Bewertungsskala   1-Min. nicht erfullt   10-Max. Alles Erfullt

Tiefenlevel der Entscheidungstabelle
LEVEL0-Rserviert
LEVEL1-CEO,CIO,High Management Ebene, Stock holders
LEVEL2-CEO, CIO,High Management Ebene, Executive and Strategien Ebend
LEVEL3-Middle Management, Organization, Planning level
LEVEL4-ProzeB und Production level, Project Management
LEVEL5-Team level, System level
LEVEL6-Operational level

COMPUTER-IMPLEMENTED METHOD AND SYSTEM FOR HANDLING BUSINESS TRANSACTIONS WITHIN AN INHOMOGENEOUS LEGAL ENVIRONMENT

FIELD OF THE INVENTION

The invention generally is in the field of business information management systems for enterprises and governmental bodies and more specifically relates to a computer-implemented method and system for handling business transactions within an inhomogeneous legal environment.

BACKGROUND

Globally operating enterprises or companies are often exposed to widely varying distinct national or regional legal environments as in the case of import/export or tax regulations or privacy laws and regulations. National import regulations, for instance, comprise specific restrictions for the import of goods from a first (source) country to a second (target) country. Various exemplary agreements exist between different countries regulating customs or turnpikes between those countries where particular goods or information are prohibited to import.

Thus doing business on such a country-overlapping scale requires that these enterprises provide particular import/export or data protection organizations having a staff of related experts or representatives. Examples are local data protection and import/export representatives for handling only these legal issues.

Another typical relating field is intra-country business transactions between a commercial organization and a national government where a lot of mandatory regulations for doing business are involved. These are examples of state secrecy obligations.

There are known so-called "trusted centers" like the IWW Certification Center operating via the Internet and offering information technology (IT) based security services for performing trusted transactions via the Internet between two or more business participants. These services allow reciprocal authentication of the participating parties e.g. by using certain interchanged certificates. But they do not check whether transferred information is compliant with legal regulations valid in the target country, the source country or even both countries.

The aforementioned requirements, for the above reasons, have a strong competitive economic or even a social impact on settlement or handling of all kinds of business transactions like business-to-business (B2B) or business-to-customer (B2C) transactions.

At present, an automized validation process or system for does not exist determining the above mentioned legal compliance of the mentioned business transactions.

SUMMARY OF THE INVENTION

It is therefore an object of the present invention to provide a method and system for simplified handling of business transactions within an inhomogeneous legal environment as described above.

Another object is to provide a computer-implemented mechanism for automized handling of such business transactions.

The idea underlying the invention is provision of a generic computerized platform for handling the aforementioned legal issues in the aforementioned business transaction arenas. More particularly, the invention proposes an integrated internal or external enterprise service for handling the above legal issues necessary for doing business within an inhomogeneous legal environment in an automated manner.

The invention advantageously can be implemented by way of a rule or knowledge based, easy to implement single procedural data processing system based on known high-level programming languages like C++, Visual Basic or Java script, or by way of a rule or knowledge based expert system, where compliance between a relevant regulation in the first and the second legal environment is determined using an appropriate computer-implemented questionnaire, as described in more detail later on, where entries by a user are evaluated and ranked thus revealing a decision ranking in the form of a recommendation or an automated triggering of the underlying transaction task.

It is noteworthy that the term business transaction includes but is not limited to transfer of data or goods or a combination thereof and can be applied not only to the above mentioned legal issues but also to enterprise-specific demands, policies or standards.

In a globally operating company or enterprise, the invention can be implemented through provision of distinct subsystems in the different countries or regions where the enterprise is present. Thereby each subsystem provides the necessary information and knowledge to handle the corresponding local requirements for doing business. These subsystems altogether can be interconnected to provide a global system.

Further, the invention can provide a central or distributed information management system independent of the underlying organizational form of the enterprise that advantageously saves considerable efforts for implementing individual representatives in all countries and supports global standardization of economic organizations. In addition, the invention allows for dynamically updating and/or adapting/integrating the underlying rules of a knowledge system with regard to changed requirements within a dynamic legal environment like dynamic changes of case laws in different countries.

It is emphasized that the invention advantageously can be applied to either business-to-business (B2B) and business-to-customer (B2C) transactions or even to customer-to-customer (C2C) transactions i.e. commercial or non-commercial transactions between private individuals as will become evident in the following.

Further it should be noted that the invention can be used advantageously in businesses performed only within a country, e.g. B2B business between a company and a government. Accordingly, it can be applied to business processes or transactions performed within a single company or group of companies.

BRIEF DESCRIPTION OF THE DRAWINGS

In the following, the invention will be described in more detail by way of preferred embodiments, referring to the accompanied drawings, from which further features and advantages of the invention become evident. In the drawings FIG. 1a,b are schematic views of two different business environments (B2C and B2B) where the present invention can be applied;

FIG. 3 shows an exemplary B2C business process using the invention for determining data privacy compliance;

FIG. 4 depicts an exemplary decision table containing global information of legal data protection requirements; and FIG. 5 depicts a typical input data template for use in a knowledge system according to the invention.

DETAILED DESCRIPTION

In the following, two different business scenarios are described in order to illustrate the broad spectrum of application fields of the present invention.

Figure 1A:
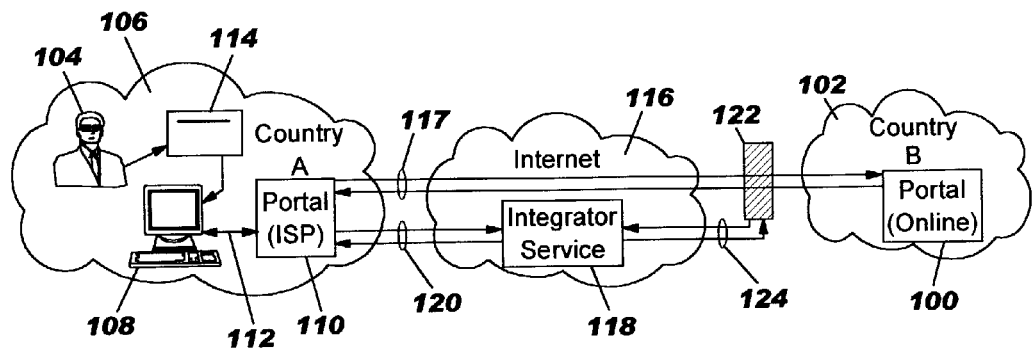

The first scenario shown in FIG. 1a is in the field of electronic commerce between an online company represented by an Internet portal 100 located in a first country B 102 and an end consumer 104 located in a different country A 106, a typical business-to-consumer (B2C) transaction. The underlying different legal environments in this scenario provide different privacy (data protection) laws in these countries 102, 106. Consumer 104 conducts the B2C transaction using a common client workstation 108, e.g. a Personal Computer (PC), that is electronically connected to an Internet portal 110 of an Internet Service Provider (ISP) via bi-directional communication lines 112. Authentication of consumer 104 and/or any necessary financial transaction during the B2C transaction is handled using known smart card technology by means of a smart card reader 114.

Data communication between the ISP portal 110 and the online shop portal 100 is accomplished using the Internet 116 represented herein by bi-directional communication lines 117. In addition, the ISP portal 110 is connected to an integrator service 118 in accordance with the present invention via communication lines 120 which, in the present embodiment, can also be accessed via the Internet 116.

After the end consumer 104 has accessed the online portal 100 and intends to conduct the underlying B2C transaction, and before performing the B2C transaction which includes transfer of the consumer's private data, e.g. name, address, credit account data, etc., the integrator service 118 is accessed by the ISP portal owner 110 in order to check that transfer of this private data is legally compliant with existing data protection laws in the source country A 106 and the target country B 102.

It is to be mentioned that the B2C transaction may also require compliance with other certain legal or organizational requirements in the company's country B 102 and/or the consumer's country A 106, in order to avoid legal infractions or infractions of company-internal regulations.

In the case that the B2C transaction also includes transfer of goods from country B 102 to country A 106, for the above legal compliancy check, in addition at least the export regulations 122 of country B 102 may also be taken into account. Further, import or tax regulations of the target country A 106 of the underlying B2C transaction may be considered. Thus, the integrator service 118 may also communicate via dotted communication lines 124 with at least turnpike 122 in order to obtain the required legal information for the underlying knowledge system used by the integrator service 118.

Figure 1B:
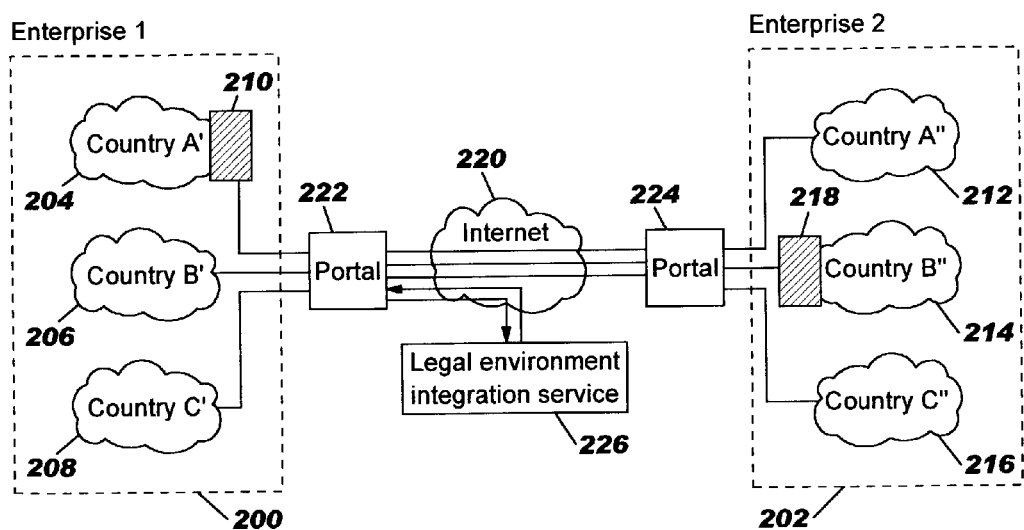

As shown in FIG. 1b, the second scenario concerns two globally operating, business-to-business (B2B) companies (enterprises) identified by dotted lines 200, 202 wherein the first company 200, which is the source company for the underlying B2B business transaction, is located in different countries A'-C' 204-208, e.g. as distinct business units. It is assumed that these countries 204-208 comprise a number of different first legal environments. In the present example, first import/export regulations applicable only in country A' 204 are marked as black box 210. The second company 202 representing the target company for the underlying B2B business transaction is located in different countries A"-C" 212-216 comprising a number of second legal environments. In the present example, a second import/export regulation is marked accordingly as another black box 218, wherein the second import/export regulation 218 is distinct from the first import/export regulation 210 valid in country A' 204.

In the second scenario depicted in FIG. 1b it is further assumed that the first company's 200 business unit located in country A' 204 intends to do business with the second company's 202 business unit located in country B" 214 via the Internet 220. For that purpose, both companies 200, 202 provide their own Internet portals 222, 224 which alternatively can be portals of Internet Service Providers (ISPs).

Besides transfer of privacy data as in the first scenario shown in FIG. 1a, the business-to-business (B2B) transaction particularly includes transfer of goods from country A' 204 to country B" wherein goods, in a first transaction step, are exported from country A' 204 to the Internet 220 thus passing the first turnpike 210 of country A' 204 and then imported via the Internet 220 to country B" 214 thereby passing the second turnpike 218 of country B" 214. As mentioned above, it is assumed that the underlying import/export regulations of the first 210 and the second turnpike 218 are different from each other and thus these regulations must be checked to ensure compliance.

In accordance with the invention, the second scenario also includes an external integrator service 226 which can be either part of the first company's 200 infrastructure, e.g. connected to the first company's 200 intranet, or an independent legal integration service provider located outside the intranet of the first company 200. In the latter case, the necessary data communication channel between the first company 200 and that service provider 226, however, has to be secure, e.g. which may be ensured by using any known data encryption technology.

Prior to execution of the transaction, a communication channel between company A' 204 and the integrator service 226 is established whereby relevant business information may be exchanged such as the source 204 and the target country 214 of the underlying transaction, and the kind of goods to be transferred from the source 204 to the target country 214. Based on the exchanged information, the integrator service 226 determines any relevant legal issues, in the present case a relevant import/export regulation issue and, in the best case, delivers a compliance statement to the first company 200, preferably in the form of a certificate that can be used for visualization of compliance through marking the underlying goods themselves e.g. using watermark technology. In the worst case, the result can be that import of the goods to country B" 214 is prohibited by law and thus the transaction has to be adapted to these legal requirements or even cancelled. Thus an alternative result could be that the transaction could be executed if certain legal requirements were fulfilled, like payment of tax fees or marking the transferred goods with a content-related inscription.

It is noteworthy that companies using an integrator service 226 for the above described purposes can be certified e.g. using a corresponding marking like a "Blue Angel" on their homepage. In that way a first company or consumer intending to do business or to purchase an article can trust the target company that any legal issues for the underlying transaction will be detected and resolved automatically.

Although the previously described embodiments are either in the field of import/export regulations or in the field of privacy law, it is understood that a real business scenario, in most cases, will be a combination thereof or even include other legal or organizational requirements. In the latter case, also company-internal business rules or the like can be handled accordingly by the invention. Further it is noted that another business scenario not shown in the drawings could be a business transaction between a private company or organization located in a country and that country's government. In such a scenario also certain legal requirements like state secrets or defense regulations or the like must be fulfilled.

Figure 2:
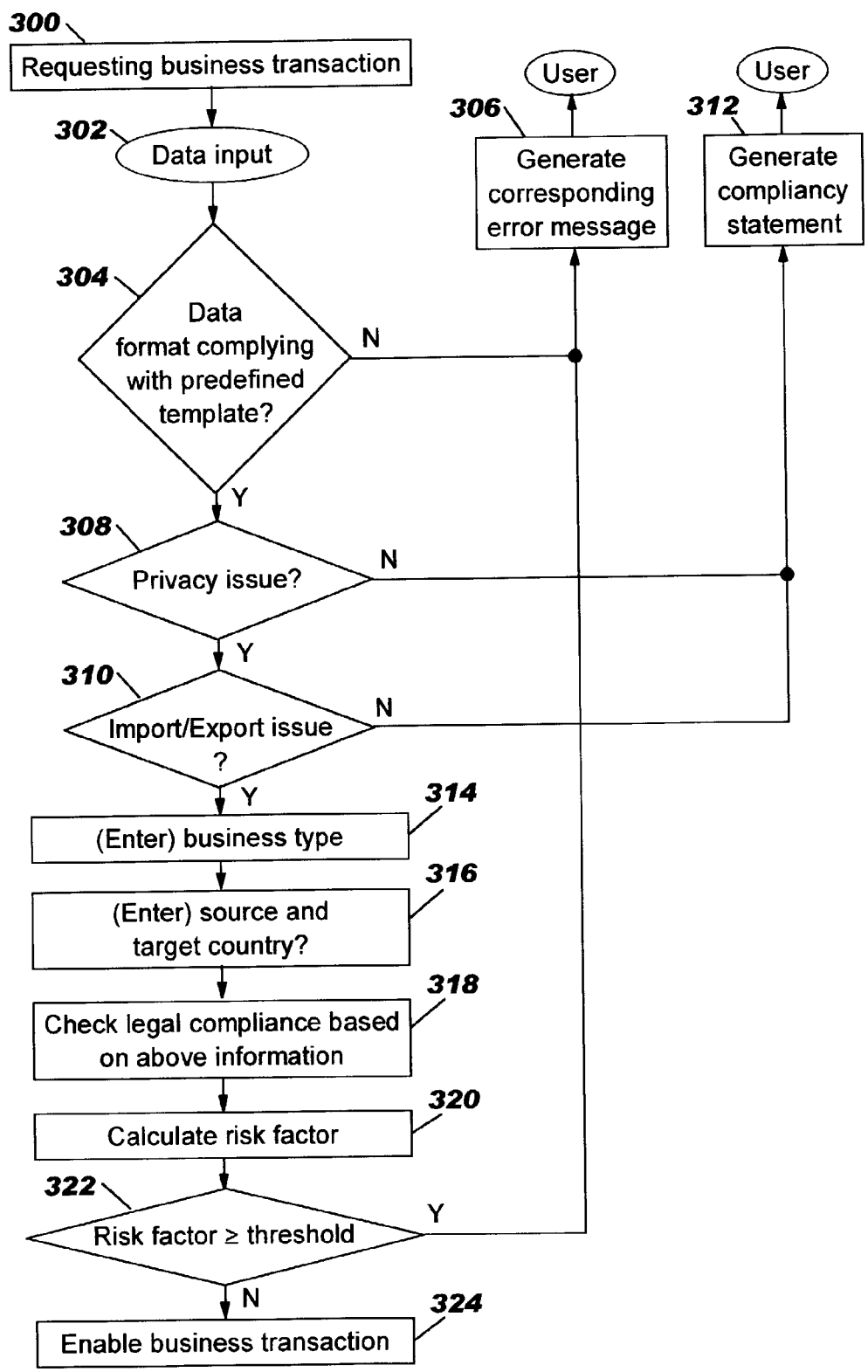
FIG. 2 is a flow diagram for illustrating process flow of a rule-based knowledge management system according to a preferred embodiment of the invention.

Now referring to the flow diagram depicted in FIG. 2, a preferred embodiment of a process for computer-implemented knowledge based handling of the above mentioned legal issues is described in more detail. The process is triggered by any request 300 for a business transaction. At first the required business information of the underlying transaction, as described beforehand, is input 302 by the requesting party. In step 304 it is checked if the data format of the input data complies with a predefined data format or template. If the input data are not in compliance with that template, a corresponding error message is generated 306 and sent to the requesting party.

If the input data format is compliant or sufficiently compliant with the predefined data format, in the following steps 308-310 it is checked whether the input data reveal the presence of a data privacy law issue or an import/export law/regulation issue. This check 308-310, in the present embodiment, is performed using a decision table described referring to FIG. 4 later on. If the check reveals that the intended business transaction comprises neither any privacy issue nor any import/export issue, then a compliancy statement is generated 312 and sent to the requesting party. If the check 308-310 reveals at least one legal issue of the kind mentioned above then the business type of the underlying transaction is automatically determined 314 using the input data 302 together with common knowledge about business transaction types stored in a knowledge database. Alternatively, instead of directly using the knowledge database, the requesting party can be asked to enter the business type, e.g. by selecting a business type out of a list of all business types.

Accordingly, in the next step 316, the source and the target country of the intended business transaction are automatically determined using the input data 302 or related additional information entered explicitly by the requesting party in response to a corresponding request delivered by the integrator service to the requesting party. In the next step 318, based on the business type and source and target country information, legal compliance of the involved legal environments, as described in more detail above, is checked. Based on the results of that check 318, a risk factor is calculated 320 and in a following step checked 322 to determine whether the calculated risk factor exceeds a predefined threshold value. If the risk factor exceeds the predefined threshold, an appropriate error message is generated 306 and sent to the requesting party. If the calculated risk factor does not exceed the threshold value, the intended business transaction is enabled 324, e.g. by way of a compliancy statement as described above.

Another embodiment of the above process is now described referring to FIG. 3 where purchase of goods via the Internet, i.e. a B2C business transaction process in an inhomogeneous privacy law environment, is described in more detail. The B2C process starts with a user, in most cases an end consumer, entering 400 an online shop portal implemented on a web server which, in the underlying scenario, is located in a country different from the user's country or the country of an Internet portal accessed by the user. On the homepage of the online shop 402, a certificate marking like the above mentioned "Blue Angel" is presented in order to inform users accessing the web page that the online shop is certified insofar as it uses an integrator service according to the invention, in the present scenario a so-called "Privacy Trust Service Center" (PTSC), in order to ensure legal compliance as described above.

If the user intends to purchase certain goods offered on the website of the online shop, he/she delivers 404 an order to the online shop, e.g. activating an online shopping process using an activation button or the like. This order is transferred to the shop together with private data of the consumer, e.g. his/her name and home address. As the online shop is PTSC certified, before executing the purchase transaction, the delivered private data is transmitted 406 to the PTSC for legal compliance evaluation.

The PTSC checks 408 the transmitted private data with regard to legal compliance of the transmission of the data between the two countries involved. If transmission of the private data is not legally compliant 410, a corresponding error message is generated 412 and sent to the user. But if transmission is legally compliant 410, then a web server of the online shop triggers 414 execution of the goods order. The goods order will then be executed 416.

It is to be noted that the goods order process itself, as in the present embodiment, can be performed in parallel to the PTSC subprocess, i.e. the goods order is already transmitted 418 to the web server of the online shop and preprocessed in order to accelerate the whole transaction process. For example, the online shop in parallel can check availability of the ordered goods or the correctness of a user's bank account and so forth.

FIG. 4 shows an exemplary decision table containing global information of legal data protection requirements. According to the underlying rules, if a first condition C1 "Good level of Compliance" is fulfilled, the rule based system performs the following action A1. It should be noted that no rule based or expert system can guarantee 100% compliance, but only reveal a certain likelihood that a given legal regulation in a first legal environment is compliant with a corresponding regulation in a second legal environment. A good system is generally characterized by a high degree of awareness among data controllers of their obligations, and among data subjects of their rights and the means of exercising them. The existence of effective and dissuasive sanctions can play an important role in ensuring respect for rules, as of course can systems of direct verification by authorities, auditors, or independent data protection officials.

The underlying rule based system uses certain conditions (in the following designated as C1, . . . , Cn) in order to perform related actions (in the following designated A1, . . . , An). If condition C2 "to provide support and help to individual data subjects" is fulfilled in the exercise of their rights, the individual must be able to enforce his/her rights rapidly and effectively, and without prohibitive costs. To do so there must be some sort of institutional mechanism allowing independent investigation of complaints.

In case of condition C3 "appropriate redress" being fulfilled, an appropriate redress action A3 to the injured party is provided where rules are not complied with. This is may involve a system of independent adjudication or arbitration which allows compensation to be paid and sanctions imposed where appropriate.

In case of condition C4 "the purpose limitation principle" being fulfilled, corresponding action A 4 is initiated. There should be limits to the collection of personal data and any such data should be obtained by lawful and fair means and, where appropriate, with the knowledge or consent of the data subject. Personal data should be relevant to the purposes for which they are to be used, and, to the extent necessary for those purposes, should be accurate, complete and kept up-todate. According to a Purpose Specification, the purposes for which personal data are collected should be specified not later than at the time of data collection and the subsequent use limited to the fulfillment of those purposes or such others as are not incompatible with those purposes and as are specified on each occasion of change of purpose. In case of a Use Limitation, personal data should not be disclosed, made available or otherwise used for purposes other than the specified purposes.

The legal background of condition C4 exemplarily in the European Union is that data should be processed for a specific purpose and subsequently used or further communicated only insofar as this is not incompatible with the purpose of the transfer. The only exemptions to this rule would be those necessary in a democratic society on one of the grounds listed in Article 13 of an underlying European Data Protection Directive.

In case of condition C5 "the data quality and proportionality principle" being fulfilled, action A5 is initiated. Regarding the above mentioned Directive, Controllers will have to familiarize themselves with the implementing legislation on appropriate safeguards for historical, statistical or scientific use of data under Article 6.1(b) and (e) of the mentioned European Directive; Controllers will have to observe the principles relating to data quality for manual filing systems as well as automated systems; Controllers must observe the principles relating to data quality regardless of the fact that they have received no complaints from data subjects. These are absolute standards. The five data quality principles are already familiar in most of the Member States of the European Union. What is new however is that the principles are now mandatory in all Member States, and that the obligation for ensuring compliance with the principles rests on the Controller. This means that the Controller must be satisfied that any activities carried out for him by a Processor are done in accordance with these principles.

In accordance with that condition, the data to be transferred during an underlying business transaction should be accurate and, where necessary, kept up to date. The data should be adequate, relevant and not excessive in relation to the purposes for which they are transferred or further processed.

In case of condition C6 "the transparency principle" being fulfilled, corresponding action A6 is initiated. Whereas such authorities must have the necessary means to perform their duties, including powers of investigation and intervention, particularly in cases of complaints from individuals, and powers to engage in legal proceedings; whereas such authorities must help to ensure transparency of processing in the Member States within whose jurisdiction they fall.

The purpose of condition C6 is that individuals should be provided with information corresponding to the purpose of the processing and the identity of the data controller in the third country, and other information insofar as this is necessary to ensure business fairness. In case of a pure European business transaction issue, the only exemptions permitted should be in line with Articles 11 (2) 3 and 13 of the European Data Protection Directive.

In case of condition C7 "the security principle" being fulfilled, action A7 is initiated. Where the Controller intends to transmit data over a network, a corresponding Article of the mentioned Directive may impose an additional requirement on Controllers to implement technical and organizational measures over and above what would otherwise be required. Controllers have to demonstrate that their security measures have been chosen by reference to their appropriate nature. Controllers have to choose Processors carefully and must draft contracts to comply with all the new requirements in Article 17. In addition, paragraph 2 may require them to enforce such contracts. Controllers will have to develop closer relationships with Processors than is currently the case. Those who fall under the definition of Processor must train their staff and re-organize their management structures to take account of the greater risk they are assuming under the Directive. Under this Article of the Directive, Controllers are obliged to take security measures to protect personal data. These security measures must be appropriate to the risks represented by the processing and the nature of the data to be protected.

Condition C7 determines that technical and organizational security measures should be taken by the data controllers that are appropriate to the risks presented by the processing. Any person acting under the authority of the data controller, including a processor, must not process data except on instructions from the controller.

In case of condition C8 "the rights of access, rectification and opposition" being fulfilled, the required action A8 is initiated. Controllers will have to re-design their subject access procedures to include the further information required by the Directive. Further, Controllers will have to either ensure that they are in a position to notify third parties to whom the data have been disclosed of any rectification, erasure or blocking, or put procedures in place which prove that this activity is impossible, or adduce evidence that the effort would be disproportionate. Controllers also need to begin recording their data sources and the organizations to whom they have disclosed data. In addition, Controllers are required to communicate the data to the data subject in an intelligible form and to be prepared to respond to data subject's requests for information without excessive delay. The law of many European Union Member States already makes some provision for subject access to personal data. Despite this fact, such requests remain minimal throughout the European Union and it is not expected that the Directive will lead to a significant increase. In the past some Controllers have taken the view that there was no point putting proper subject access mechanisms in place because of the small number of requests. However, in preparing for the implementation of the Directive into national law, Controllers should pay particular attention to the following points: The fact that subject access requests will now extend to manual files could pose problems for Controllers holding large amounts of information on manual files especially where such files are dispersed throughout the Controller's organization, in different departments and indeed sometimes in different Member States. In this context it should also be noted that the possible exemption from certain provisions of the Directive for up to 12 years for manual files does not apply to subject access; and the amount of information to which the data subject is entitled. In addition to accessing personal information, under the new law the data subject must be given information concerning the purpose of the processing, categories of data, recipients or categories of recipients and the logic involved any automated decision systems.

The legal background of condition C8 therefore is that the data subject should have a right to obtain a copy of all data relating to him/her that are processed, and a right to rectification of those data where they are shown to be inaccurate. In certain situations he/she should also be able to object to the processing of the data relating to him/her.

In case of condition C9 "restrictions on onward transfers" being fulfilled, action A9 is initiated. Controllers must identify the third countries to which they transmit or intend to transmit data undergoing processing or transmit personal data which are intended for processing in such a third country.

Many factors have led to an increase in transfers of information, including personal data, to third countries. These include the global nature of many businesses, the growth in telecommunications networks and the subsequent possibility of making use of processing facilities in other countries where input costs are lower. Where data which have been processed in a third country are subsequently to be used within the EU, the processing will be covered by EU law. Controllers should be aware that once the Directive is in force, there could be restrictions or even prohibitions on transferring data to some third countries. This will be the case where, subject to various exceptions (see in this respect Article 26), that third country is not seen as having "adequate" protection. How will a Controller know whether the country to which he sends his data for processing has an adequate level of protection? According to the Directive, the matters that have to be taken into account in making this assessment include: The nature of the data, its purpose, duration etc. Thus it is possible that a third country may have an adequate level of protection for some processing operations but not for others. It is also possible that the Member States will approach this problem in different ways. At this stage, there appear to be at least three options: The Controller himself takes the decision; the Controller takes the decision based on the guidance of the Supervisory Authority and must get the authorization of the Supervisory Authority prior to making any transfer.

The legal basis of condition C9 is that further transfers of the personal data by the recipient of the original data transfer should be permitted only where the second recipient (i.e. the recipient of the onward transfer) is also subject to rules affording an adequate level of protection. The only exceptions permitted should be in line with Article 26 (1) of the European Data Protection Directive.

In case of condition C10 "Economically Cost and Business Management Control" being fulfilled, corresponding action A10 is initiated, i.e. the data are only processed if cost efficiency, Service Level agreements and management instruments for controlling exist. The underlying legal issue is that the data processor must have proof of an adequacy of capital resources, skilled people and cost management instruments. He must have also Business Management Control Instruments by processing with personal data.

In case of condition C11 "Consideration of international Privacy Regulations" being fulfilled, action A11 is in initiated, i.e. the data are only processed if international law based and self-economic data protection regulations are considered. The legal background for condition C11 is to ensure considered and integrated provision of international privacy regulation by personal data processing.

Finally, FIG. 5 depicts a typical, and perhaps standardized, input data template (format) for use in a rule-based knowledge system according to the invention. In the shown embodiment, the table comprises a number of columns which, from the left to the right, relate to the user's name and home address, birthday, insurance, bank account, and so forth. The templates are used to simplify the above described data format compliance check.

The above described legal integrator process or system can be implemented using commonly known high-level programming languages like C++ or Visual Basic or even platform-independent languages like Java script. The main task of such an implementation is checking compliance with the above mentioned context-dependent legal rules, i.e. conditions and related actions.

The following is an exemplary pseudo code for implementation of the process according to the invention in case of an above described data privacy compliance issue:

Define & Identify Relevant Parts of underlying business transaction:
  Define & Identify External Subjects (Data Owner, Data Processor, Data Sender, Data Receiver, Legacy regulations, . . . )
  Define & Identify Internal Objects (Data Owner, Data Processor, Data Sender, Data Receiver, Legacy Regulations, . . . )
  Define & Identify involved Sites and Countries (Home Site, Target Site, Transport Site, . . . )
  Define & Identify Resource Objects for the Transfer of data or goods (Physically, Electronically, Personally, . . . )
  Define & Identify Processing Type (Automatic Data Processing System, Manually, . . . )
  Define & Identify Transport Resource (Internet, e-mail, Tape, Disc, Box, Transport agency)
  Define & Identify Internal References System (Enterprise Customer System, Enterprise Legacy Environment System, . . . )
  Define & Identify External References System (OECD Legal, UN Legal, WTO, EU, EC, CIA, USA, . . . )
  Define & Identify Parameters from Requestor (Template of Data Input from Internet, Mail or other resources)
  Define & Identify Relation (Business to Business, Business to Person, Business to Government, Business to Global)
  Define & Identify Process Level (Stack Holders CEO Level, CIO Level, Middle Management Level, Process Management, Project Management, Team Level, Operational Level)
  Define Score (Scale of scores e.g. 1-10, Max. score=10 if all requirements are met; score between 6 and 10 if minimum requirements are met; score below 6 if minimum requirements are not met)
  Define Legal Condition for the transfer of personal data in the $3^{rd}$ countries (C1 . . . C11)
  Define Legal Actions for the transfer of personal data in the $3^{rd}$ countries (A1 . . . A11) in recording with C1 . . . C11
  Define common terms definitions (in Article 2 of EU-Data Protection Directives 95/46/EC) wherein
    'personal data' shall mean any information relating to an identified or identifiable natural person;
    'data subject' shall mean an identifiable person is one who can be identified, directly or indirectly, in particular by reference to an identification number or to one or more factors specific to his physical, physiological, mental, economic, cultural or social identity;
    'processing of personal data' ('processing') shall mean any operation or set of operations which is performed upon personal data, whether or not by automatic means, such as collection, recording, organization, storage, adaptation or alteration, retrieval, consultation, use, disclosure by transmission, dissemination or otherwise making available, alignment or combination, blocking, erasure or destruction;
    'personal data filing system' ('filing system') shall mean any structured set of personal data which are accessible according to specific criteria, whether centralized, decentralized or dispersed on a functional or geographical basis;
    'controller' shall mean the natural or legal person, public authority, agency or any other body which alone or jointly with others determines the purposes and means of the processing of personal data; where the purposes and means of processing are determined by national or Community laws or regulations, the controller or the specific criteria for his nomination may be designated by national or Community law;

'processor' shall mean a natural or legal person, public authority, agency or any other body which processes personal data on behalf of the controller;

'third party' shall mean any natural or legal person, public authority, agency or any other body other than the data subject, the controller, the processor and the persons who, under the direct authority of the controller or the processor, are authorized to process the data;

'recipient' shall mean a natural or legal person, public authority, agency or any other body to whom data are disclosed, whether a third party or not; however, authorities which may receive data in the framework of a particular inquiry shall not be regarded as recipients;

'the data subject's consent' shall mean any freely given specific and informed indication of his wishes by which the data subject signifies his agreement to personal data relating to him being processed.

END Define & Identify
GET Input Data & Parameters
Identify Request and Requestor
Data Privacy issue?
   IF NOT THEN Inform Requestor for further processing
   IF Privacy issue THEN perform the following steps:
Validate defined & identified above in defined Part
WHILE Condition n=1 to 11 meet the requirements
   IF the requester does not meet required data format (see template) condition THEN Inform Requestor for further processing
   IF Condition C1 meets the requirements THEN process Action A1→Write/Score Results from 1-10
   IF Condition C2 meets the requirements THEN process Action A2→Write Score Results from 1-10
   IF Condition C3 meets the requirements THEN process Action A3→Write Score Results from 1-10
   IF Condition C4 meets the requirements THEN process Action A4→Write Score Results from 1-10
   IF Condition C5 meets the requirements THEN process Action A5→Write Score Results from 1-10
   IF Condition C6 meets the requirements THEN process Action A6→Write Score Results from 1-10
   IF Condition C7 meets the requirements THEN process Action A7→Write Score Results from 1-10
   IF Condition C8 meets the requirements THEN process Action A8→Write Score Results from 1-10
   IF Condition C9 meets the requirements THEN process Action A9→Write Score Results from 1-10
   IF Condition C10 meets the requirements THEN process Action A10→Write Score Results from 1-10
   IF Condition C11 meets the requirements THEN process Action A11→Write Score Results from 1-10
   IF each score from C1-C11 and A1-A10 is less than the minimum requirements THEN 6 ELSE→Inform Requestor for further processing
   IF each score from C1-C11 and A1-A10 is more than the minimum requirement THEN 6 THEN
     Certify the requestor as "e-Legacy enabled" Transport his data to the Target Country
   END IF
WHILE END
END Monitor Decision Results:
For example, IF Score is less than 60% THEN transfer of underlying data is cancelled or prevented, or IF Score is greater than 60% THEN the requestor is informed about the transfer of the data.

I claim:

1. A program product stored on a computer readable medium for handling at least one electronic business transaction between a first transaction participant located in a first legal environment and a second transaction participant located in a second legal environment, wherein said business transaction includes a transfer of data or goods or a combination thereof between said first and said second transaction participants, the computer readable medium comprising program code for causing a computer system to perform the following steps:

providing first information relating to at least one regulation in said first legal environment;

providing second information relating to at least one regulation in said second legal environment;

comparing, prior to said transfer of data or goods or a combination thereof, said first and said second information in order to determine compliance between said at least one regulation in said first and said second legal environment; and calculating a risk factor based on the compliance, comparing the risk factor to a threshold value, and providing a compliancy statement to at least the first transaction participant in response to the comparison of the risk factor to the threshold value.

2. A computer-implemented business transaction system for handling a business transaction between a transaction requester located in a first legal environment and a transaction recipient located in a second legal environment that includes at least one regulation distinct from a corresponding regulation in said first legal environment, wherein execution of said business transaction includes transfer of data or goods between said transaction requester and said transaction recipient, said system comprising:

means for gathering information relating to regulations in the first legal environment and the second legal environment, and means for evaluating said information in order to determine compliance between said regulations in the first legal environment and the second legal environment, said evaluating means including:

means for comparing, prior to said transfer of data or goods or a combination thereof, said first and said second information in order to determine compliance between said at least one regulation in said first and said second legal environment, means for calculating a risk factor based on the compliance, means for comparing the risk factor to a threshold value, and means for providing a compliancy statement to at least the first transaction participant in response to the comparison of the risk factor to the threshold value.

3. The system according to claim 2, wherein said information is transferred using a document template.

4. The system according to claim 2, wherein said means for evaluating uses knowledge-dependent compliancy rules.

5. The system according to claim 2, wherein said means for evaluating uses context-dependent compliancy rules.

* * * * *